Oct. 17, 1950     O. E. BROWNSEY     2,526,195
CARTRIDGE CONTAINER
Filed July 17, 1947
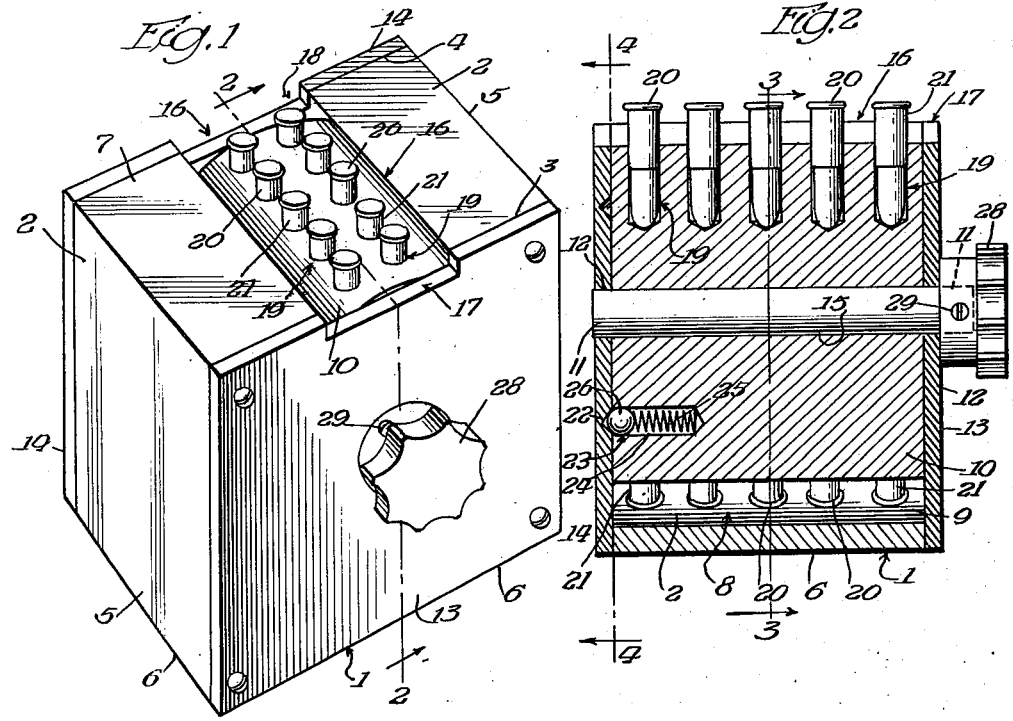
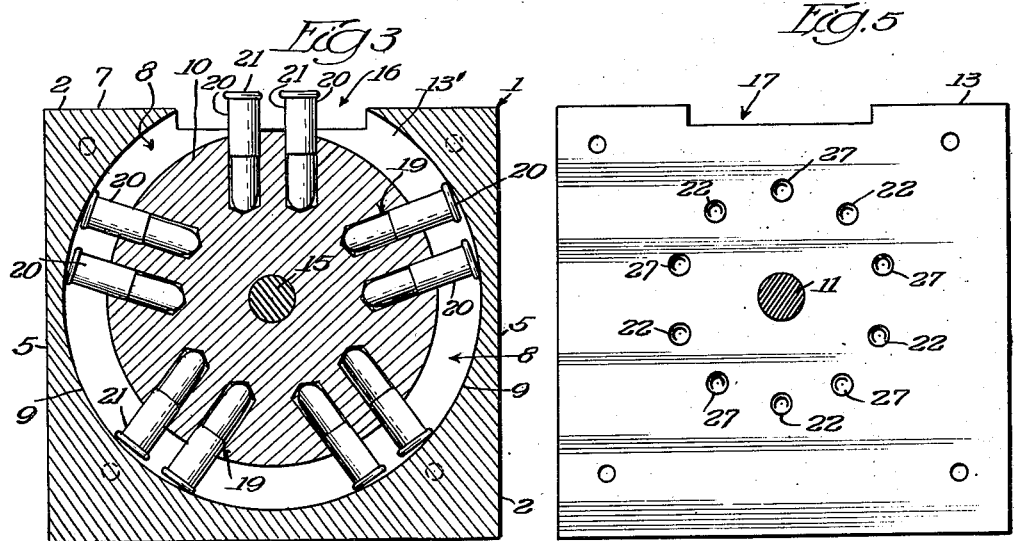
INVENTOR:
Oscar E. Brownsey
By Spencer, Marzall,
Johnston & Cook,
Attys.

Patented Oct. 17, 1950

2,526,195

UNITED STATES PATENT OFFICE 2,526,195

CARTRIDGE CONTAINER

Oscar E. Brownsey, La Porte, Ind., assignor of one-half to Everett L. Brownsey, La Porte, Ind.

Application July 17, 1947, Serial No. 761,531

1 Claim. (Cl. 224—18)

This invention relates to a cartridge container, and its primary object is to provide a small, attractive cartridge container which may be manipulated readily and easily to bring a plurality of rows of cartridges into position while maintaining other cartridges carried by the container in proper position so that they are prevented from falling out or becoming otherwise dislodged but are capable of being brought to position selectively by the mere partial rotation of a knob.

Numerous other objects and advantages will be apparent throughout the progress of the specification which follows.

The accompanying drawing illustrates a selected embodiment of the invention, and the views therein are as follows:

Fig. 1 is a detail perspective view of the improved cartridge container;

Fig. 2 is a detail vertical sectional view on the line 2—2 of Fig. 1;

Fig. 3 is a detail vertical sectional view on the line 3—3 of Fig. 2;

Fig. 4 is a detail elevational view similar to Fig. 3 but showing the rotor or cartridge carrying member in an inoperative position; and Fig. 5 is a detail vertical sectional view on the line 4—4 of Fig. 2.

The particular cartridge box 1, herein shown for the purpose of illustrating the invention, comprises a casing or housing 2. This casing or housing 2 is made preferably in one piece from wood, or it may be formed of any other suitable material such as plastic. The casing has a front 3, a back 4, two sides 5, 5, a bottom 6 and a top 7. The central part of the housing 2 is hollow from front to rear to form a cylindrical opening 8, defined by a surrounding wall 9, a solid, or preferably solid, cylindrical member or rotor 10 being arranged in the cylindrical opening 8. The peripheral wall of the solid cylindrical member or rotor 10 is spaced a predetermined distance from the cylindrical wall 9 which surrounds and defines the cylindrical opening 8.

The solid cylindrical rotor member 10 is provided with end trunnions 11, 11, Fig. 2, to support the rotor member 10 revolubly, or rotatably, in the cylindrical opening 8. The trunnions 11, 11 are received in openings 12, 12 found in closure plates 13 and 14 secured, in any suitable manner, such as by screws, to the front and rear faces, respectively, of the front 3 and back 4 of the housing 2. The trunnions preferably are formed integrally with the member 10, but they may constitute projecting ends of a rod or shaft 15 which extends axially through the member 10, as clearly shown in Fig. 2. The trunnions 11, 11, therefore, revolubly or rotatably support the rotor member 10 axially within the cylindrical opening 8 and in spaced relation with the cylindrical wall 9 which surrounds the cylindrical opening 8.

The casing 2 has an opening 16 extending from front to rear, and this opening is of a certain definite width to permit access to the member 10. The front and the rear closure plates 13 and 14 are notched at 17 and 18, respectively, so as to perpetuate the opening 16.

The rotor or member 10 is provided with five series of holes or openings 19 extending peripherally thereabout to receive cartridges 20. Each series of openings 19 comprises two closely spaced rows, each row containing five holes. Each opening or hole is adapted to receive a cartridge 20. Each row, therefore, comprises five holes, while each series comprises two rows of holes making ten holes for a series. There are five such series; therefore, fifty cartridges may be accommodated in the rotor or member 10. Each row of holes of a series is spaced relatively closely, while each series is spaced farther apart, thereby making it possible to bring a series of holes into position with respect to the opening 16, so that there will be ten cartridges in position where they may be removed, preferably one at a time. Each hole is parallel to a radial plane bisecting the space between the pair of rows of cartridge receiving holes of which the hole is a part. Each hole extends inwardly into the rotor or member 10 a predetermined distance so that a major portion of each cartridge will be received within a hole, and each outer end 21 of a cartridge 20 will protrude outwardly from the outer surface of the member 10 a distance sufficient to be grasped easily. The distance of the projection 21, however, is slightly less than the space 13' between the outer face of the rotor member 10 and the inside circular surrounding wall 9 of the casing 2. This construction, therefore, permits ten cartridges to be brought to position so as to be removed through the opening 16, but the remaining cartridges will remain in the rotor. The remaining cartridges cannot fall out of their respective openings because their outer ends will contact with the cylindrical enclosing wall 9 of the casing. The cartridges in each series 19 may be brought selectively to position with respect to the opening 16.

One end panel (preferably the end panel 14) is provided with a plurality of spaced indentations 22, Fig. 5, which are arranged in the form of a circle, as shown in Fig. 5; and a detent 23, Fig. 2, is arranged in an opening or hole 24 in one side of the rotor member 10, and adapted for selective engagement with an indentation 22. The detent 23 comprises a spring 25 arranged in the bore or hole 24, urging a ball 26 outwardly, whereby the ball 26 may be received, or seated in any one of the indentations 22. The indentations 22 are so located that the ball 26 will be received in an indentation 22, whereby a series of cartridges may be brought into position centrally of the opening 16, Figs. 1 and 3. Therefore, when it is desired to remove a cartridge, the rotor will be held stationary. Additional indentations 27 may be spaced between the openings or indentations 22 so as to hold the rotor in position between a series 19, whereby all the cartridges, or all the remaining cartridges not used, may be arranged in position away from the opening and held within the casing, as shown in Fig. 4, whereby none of the cartridges will fall out of the opening 16 even should the container be held upside down.

An operating knob or handle 28 may be secured to a trunnion 11 to cause rotation of the rotor member 10. The knob may be secured removably to a trunnion by means of a set screw 29, Fig. 1.

Target practice and competition shooting, often, if not usually, requires each shooter to shoot fifty cartridges, many times shooting ten cartridges from various positions. The present invention, therefore, provides a neat, small, compact cartridge case which holds a sufficient number of cartridges to be brought to position for immediate use, preventing the remaining cartridges from falling out of their respective holes. A series of cartridges may be brought to position by turning the handle or knob 29 to turn the rotor. The rotation of the rotor causes the ball 26 to become engaged with a proper indentation 22, clicking past an indenture 27. The ball 26 is received in an indentation 27 for carrying purposes as there will be ten cartridges at the opening 16 when the ball is at home in an indentation 27. The rotor 10 may be brought to the position shown in Figs. 1, 2 and 3 to bare cartridges, or to conceal cartridges when the rotor is turned to a position shown in Fig. 4, there being five positions for cartridge removal and five positions for cartridge concealment.

The invention provides a cartridge carrying device which may be easily manipulated to bring cartridges into use or to conceal or cover up cartridges so that they will not be dislodged while being carried, the arrangement being such that the rotor which carries the cartridges may be rotated to bring series of cartridge carrying holes into place or to lock the rotor into inoperative position by means of a flexible detent engaging indentations.

The device may be readily and economically manufactured, is strong and durable in construction, and is not likely to get out of order.

Changes may be made in the form, construction and arrangement of the parts without departing from the spirit of the invention or sacrificing any of its advantages, and the right is hereby reserved to make all such changes as fairly fall within the scope of the following claim.

The invention is hereby claimed as follows:

A cartridge container comprising a casing enclosing a cylindrical space, an elongated access opening in said casing communicating with said space, a cylindrical member rotatable mounted in said casing on the axis of said space, a plurality of spaced pairs of axially extending rows of radial openings in said member for receiving cartridges, the cylindrical wall of said member being spaced from the inner cylindrical wall of said casing surrounding the space therein a distance less than the length of said cartridges, thereby to prevent the cartridges within the casing from falling out, means for rotating said member, and resilient detent means for releasably holding said member either in a position where one of said pairs of rows of radial openings is exposed at said access opening for removal of cartridges therefrom, or where none of said rows of openings are so exposed.

OSCAR E. BROWNSEY.

REFERENCES CITED

The following references are of record in the file of this patent:

UNITED STATES PATENTS

| Number | Name | Date |
|---|---|---|
| 91,249 | McGinness | June 15, 1869 |
| 139,885 | Elliot | June 17, 1873 |
| 621,425 | McKenzie | Mar. 21, 1899 |
| 823,202 | Boye | June 12, 1906 |
| 1,183,054 | Weck | May 16, 1916 |
| 1,444,308 | Dunning | Feb. 6, 1923 |
| 2,245,841 | Weiss | June 17, 1941 |